US008212832B2

(12) United States Patent
Stefanidis et al.

(10) Patent No.: US 8,212,832 B2
(45) Date of Patent: Jul. 3, 2012

(54) METHOD AND APPARATUS WITH DYNAMIC GRAPHICS SURFACE MEMORY ALLOCATION

(75) Inventors: Steve Stefanidis, Richmond Hill (CA); Jeffrey G. Cheng, Toronto (CA); Philip J. Rogers, Pepperell, MA (US)

(73) Assignee: ATI Technologies ULC, Markham, Ontario (CA)

( * ) Notice: Subject to any disclaimer, the term of this patent is extended or adjusted under 35 U.S.C. 154(b) by 556 days.

(21) Appl. No.: 11/298,024

(22) Filed: Dec. 8, 2005

(65) Prior Publication Data

US 2007/0132770 A1   Jun. 14, 2007

(51) Int. Cl.
G06F 12/02 (2006.01)

(52) U.S. Cl. ........................................................ 345/543

(58) Field of Classification Search .................. 345/543, 345/548, 541
See application file for complete search history.

(56) References Cited

U.S. PATENT DOCUMENTS

| 4,959,770 | A | | 9/1990 | Kondo et al. | |
|---|---|---|---|---|---|
| 5,757,386 | A | * | 5/1998 | Celi et al. ........................ | 345/548 |
| 5,790,130 | A | * | 8/1998 | Gannett ........................... | 345/587 |
| 6,070,002 | A | * | 5/2000 | Hagemark et al. ............. | 709/250 |
| 6,683,615 | B1 | * | 1/2004 | Baldwin ........................ | 345/543 |
| 6,724,390 | B1 | * | 4/2004 | Dragony et al. ............... | 345/543 |
| 6,828,975 | B2 | * | 12/2004 | Noyle ............................. | 345/522 |
| 7,023,445 | B1 | * | 4/2006 | Sell ................................ | 345/557 |
| 7,355,601 | B2 | * | 4/2008 | Andrews et al. ............... | 345/505 |
| 2003/0184548 | A1 | * | 10/2003 | Emmot et al. .................. | 345/501 |
| 2003/0210248 | A1 | * | 11/2003 | Wyatt ............................. | 345/541 |
| 2004/0160446 | A1 | | 8/2004 | Gosalia et al. | |
| 2004/0160449 | A1 | * | 8/2004 | Gossalia et al. ............... | 345/543 |
| 2004/0187122 | A1 | | 9/2004 | Gosalia et al. | |
| 2004/0187135 | A1 | | 9/2004 | Pronovost et al. | |
| 2004/0231000 | A1 | | 11/2004 | Gossalia et al. | |
| 2004/0243766 | A1 | | 12/2004 | Lovelace | |
| 2005/0024376 | A1 | * | 2/2005 | Gettman et al. ............... | 345/582 |
| 2005/0151748 | A1 | * | 7/2005 | Cho ............................... | 345/548 |
| 2005/0168472 | A1 | | 8/2005 | Gosalia et al. | |

FOREIGN PATENT DOCUMENTS

DE   3718750 A1   11/1987
EP   0829820 A2   3/1998

OTHER PUBLICATIONS

Intel; Intel 865G Chipset Dynamic Video Memory Technology; Feb. 2004; pp. 1-10.

(Continued)

Primary Examiner — Edward Martello
(74) Attorney, Agent, or Firm — Faegre Baker Daniels LLP (57) ABSTRACT

An apparatus and method utilizes system memory as backing stores so that local graphics memory may be oversubscribed. Surfaces may be paged in and out of system memory based on the amount of usage of the surfaces. The apparatus and method also prioritizes surfaces among different tiers of local memory (e.g. frame buffer), non-local memory (e.g. page locked system memory), and system memory backing stores (e.g. pageable system memory) locations based on predefined criteria and runtime statistics relating to the surfaces. As such, local memory may be, for example, expanded without extra memory costs such as adding a frame buffer memory to allow graphics applications to effectively use more memory and run faster.

41 Claims, 7 Drawing Sheets

OTHER PUBLICATIONS

Intel; Intel 82810 Graphics Controller Video Memory Description; printed Nov. 30, 2005 from www.support.intel.com; p. 1.
Intel; Graphics Dynamic Video Memory Technology (DVMT)—How much video memory do I have?; printed Nov. 30, 2005 from www.support.intel.com; p. 1.

European Patent Office International Search Report for International Application No. PCT/IB2006/003542, dated Apr. 19, 2007.
EP Office Action from European Patent Office; EP Application No. 06831670.2; dated Jun. 22, 2011.

* cited by examiner

METHOD AND APPARATUS WITH DYNAMIC GRAPHICS SURFACE MEMORY ALLOCATION

FIELD OF THE INVENTION

The invention relates generally to systems that share local and non-local memory and more particularly to systems that employ graphics processing circuitry and a processor that employ local memory and system memory that utilize local memory such as frame buffer memory and main memory sharing for improved performance.

BACKGROUND OF THE INVENTION

Devices are known, such as laptop computers, desktop computers, cell phones, cable set top boxes, printers and other devices, that employ graphics processing circuitry, such as a graphics processor and another processor, such as a CPU. The graphics processing circuitry uses portions of local memory such as a frame buffer to store surfaces (e.g., texture buffers, vertex buffers, z buffers etc) in the local memory. For example, frame buffers on-chip with the graphics processing circuitry or on any common substrates, such as a printed circuit board or other substrate, are typically coupled via a local bus. The other processor uses the system memory as has portions thereof referred to as non-local memory that is page locked system memory. The system memory is typically located off-card or off-chip from the graphics processing circuitry and is coupled to the graphics processor chip through a slower bus than the bus that couples the local memory to the graphics processing circuitry. A local memory therefore is memory that is in communication with the graphics processing circuitry through a local bus that has a bandwidth higher than the bandwidth of the bus coupled to the non-local system memory.

As more intensive graphics processing applications such as games or other applications become available, the frame buffer memory may not be adequate in size to accommodate all processing by the graphics processing circuitry. Accordingly, systems are known that attempt to provide an optimum amount of memory that is allocated for balancing graphics and CPU performance that may attempt to dynamically respond to system requirements and application demands by allocating display, texturing and buffer memory after an operating system is booted. As such, additional allocation of system memory (non-local memory areas) may be provided to a 3D application and when the 3D application is finished, the allocated memory is unallocated so that the system memory can be returned to the operating system. As such, a preallocated amount of memory may be taken from main system memory to be dedicated for 3D graphics usage. However, it is believed that such systems may not provide adequate memory allocation when, for example, a memory intensive application is running since the memory is preallocated and after the allocation size has been met, the application may have difficulty running due to an inadequate memory size allocation. As such, these two tier graphics memory allocation systems that utilize local memory and non-local memory areas could be oversubscribed and a graphics application could fail to run properly.

Accordingly, a need exists that overcomes one or more of the above problems.

BRIEF DESCRIPTION OF THE DRAWINGS

The invention will be more readily understood in view of the following description when accompanied by the below figures and wherein like reference numerals represent like elements.

DETAILED DESCRIPTION OF THE PRESENT EMBODIMENTS

Briefly, an apparatus and method utilizes system memory as backing stores so that local graphics memory may be oversubscribed. Surfaces may be paged in and out of system memory based on the amount of usage of the surfaces. The apparatus and method also prioritizes surfaces among different tiers of local memory (e.g. frame buffer), non-local memory (e.g. page locked system memory), and system memory backing stores (e.g. pageable system memory) locations based on predefined criteria and runtime statistics relating to the surfaces. As such, local memory may be, for example, expanded without extra memory costs such as adding a frame buffer memory to allow graphics applications to effectively use more memory and run faster.

In one embodiment, an apparatus and method determines whether a surface stored in a memory location such as a local memory, is being referenced by a graphics processing circuit and evicting, if necessary, the surface from the memory location to a system memory backing store based on dynamic surface allocation priority data. The dynamic surface allocation priority data may be based on static surface location preference data and dynamically determined surface related data. One example of static surface location preference data is a preference value based on the type of the surface. For example, if the surface is for textures, it is given a preference by a graphics driver for storage in the local memory. If the surface is for a vertex buffer, the surface location preference may be initially allocated in non-local memory. The dynamically determined surface related data may be accumulated during runtime and may be for example data representing how often a surface is used during the generation of a frame or number of frames. Other information may also be used if desired.

An apparatus and method also allocates memory by allocating at least the first surface to at least a local memory and at least the second surface to a non-local memory and re-allocating either the first surface to the non-local memory or the second surface to the local memory based on dynamic surface allocation priority data obtained for each of the first and second surfaces. The surface locations are dynamically prioritized or re-allocated so that for example a frequently-referenced surface is moved from a less-preferred location to a more-preferred location such as from non-local to local memory or a surface at a less preferred location (e.g., vertex surface in non-local memory) is moved to a more preferred location (local memory) when room becomes available in the local memory. In one embodiment, the dynamic surface allocation prioritization data is based on at least surface type data, such as whether the surface is for texture surface, vertex buffer, a Z buffer, a color buffer, and at least based on surface usage data, such as the frequency of the use of the surface over a span of multiple frames.

An apparatus and method may initially allocate surfaces into local memory and/or non-local memory, generate virtual command information for each referenced surface and determine if the given surfaces are optimally allocated in memory based on prioritization data which may include, for example, surface type data and surface usage data. A surface may be, for example, a piece or section of memory allocated for use by a graphics processing circuitry for use in graphics and/or video processing.

In one example, a dynamic bookkeeping of surface usage may be used in a surface allocation prioritization scheme so that surfaces may be evicted, for example, from local memory to system memory backing store (which may be page locked), promote a surface that is in non-local memory, to local memory, for example, if the surface is used often, demote a surface from non-local memory to system memory backing store or from local memory to non-local memory if, for example, the surface is not used frequently enough over multiple frames, or any other allocation based on suitable prioritization criteria.

As such, the apparatus and system includes monitoring logic that keeps track of surface usage over a number of frames and if the surface is in a non-local memory but is used often enough, a surface may get promoted to local memory and a less frequently used surface may get swapped to the non-local memory to facilitate promotion and demotion of surfaces. As part of the demotion of the surface, the surface may also be demoted to a system memory backing store location as well, if desired. In one example, a weight factor is associated with a surface as well as the surface type and combined with usage data of the surfaces that is dynamically tracked. This information is then used to determine whether to relocate a surface from the current location to a different location.

Figure 1:
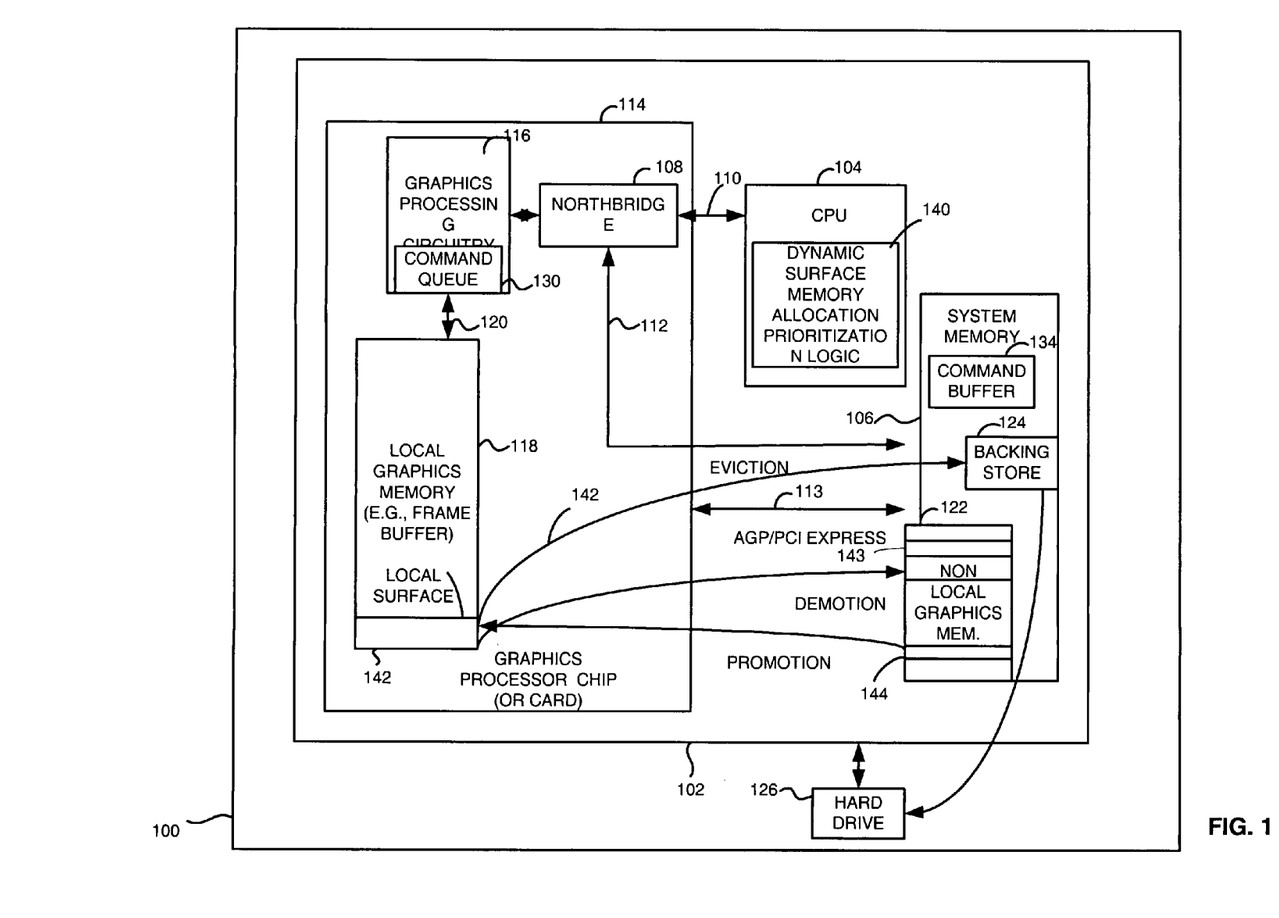
FIG. 1 is a block diagram illustrating one example of an apparatus that employs a dynamic surface memory allocation prioritization scheme in accordance with one embodiment of the invention.

FIG. 1 illustrates one example of a device 100 that utilizes dynamic surface memory allocation prioritization logic to prioritize surface memory locations to allow graphics processing circuit to dynamically relocate memory surfaces to allow optimum surface location for graphics and/or video rendering. The device 100 may be any suitable device, including but not limited to, a laptop computer, desktop computer, cell phone, cable set top box, printer, server, or any other suitable device. As such well-known components of those devices are not shown for purposes of simplicity. The device 100, in this example, is shown to include a motherboard 102 that contains a processor 104 which as used herein may include one or more processors such as one or more CPUs, DSPs, or any other suitable programmable processing logic that may, for example, execute instructions that are stored in memory to allow the processor to carry out the operations described herein. It will also be recognized that instead of a device that executes instructions, that the operations described herein may be implemented in discrete logic, state machines, or any other suitable combination of hardware and software.

The motherboard 102 also includes system memory 106 operably coupled to the processor 104 through north bridge 108 as known in the art or directly if desired. The processor 104 is operably coupled to the north bridge 108 and the system memory 106 through suitable buses 110 and 112. The motherboard is operably connected to a daughterboard 114, which in this example includes graphics processing circuitry 116, such as a graphics processing chip, and local graphics memory 118, such as a frame buffer. The graphics processing circuitry 116 and local memory 118 are suitably coupled through a local bus 120. The graphics processing circuitry 116, as known in the art, is also coupled to the processor 104 through the north bridge 108 through the bus 110. The graphics processing circuitry 116 is coupled to the system memory 106 through a bus 113 which may be, for example, an AGP bus, PCI express bus or any other suitable bus and the bus 113 typically has a lower bandwidth than the local bus 120. The system memory 106 contains non-local memory 122 that is page locked. The system memory 106 also includes backing store memory 124 which is pageable system memory that may be, for example, paged out to a hard drive 126.

The graphics processing circuitry 116, as known in the art, may include a command queue 130 which stores commands for execution by the graphics processing circuitry 116. It will also be recognized that the daughterboard 114 may in fact be a graphics processor chip which is an integrated circuit that contains the components shown in the diagram.

The system memory 106 also stores a command buffer 134 which is then submitted to the graphics processing circuitry 116 and the commands and information therein are stored in the command queue 130 for execution by the graphics processing circuitry.

In this example, the processor 104 may include on-board memory that stores executable instructions or the system memory 106 may store executable instructions that when executed cause the processor 104 to carry out the operations described herein. In this example, the processor 104 executes stored instructions that cause the processor 104 to serve as dynamic surface memory allocation prioritization logic 140. The executable instructions may be implemented, for example, as a 3D software driver and corresponding dynamic link library (dll) or any other suitable software modules.

As noted above, the local memory 118 stores one or more surfaces 142 and non-local memory 122 may store one or more surfaces 144. These surfaces are used by the graphics processing circuitry 116 to render information that is displayed on one or more suitable display devices.

Figure 2:
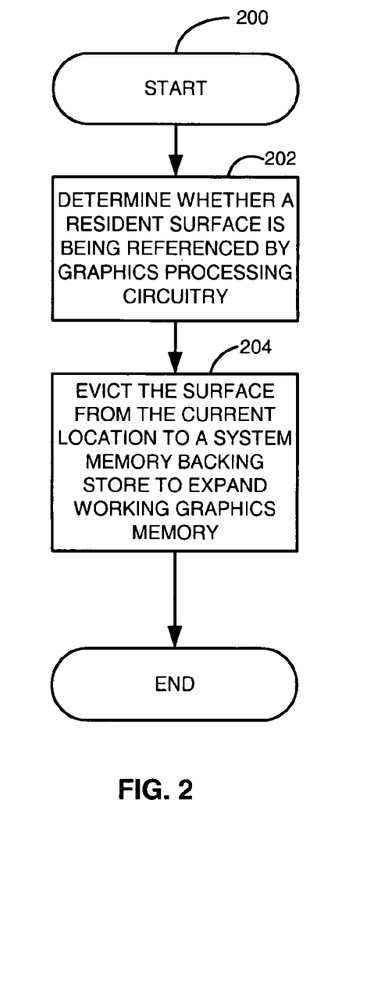
FIG. 2 is a flow chart illustrating one example of a method for allocating memory in accordance with one embodiment of the invention.

For purposes of illustration, it will be assumed that an application requiring 3D rendering is being executed by the processor 104 along with suitable 3D drivers and other software modules. Referring also to FIG. 2, a method for allocating memory is shown that may be carried out, for example, by the dynamic surface memory allocation prioritization logic 140, or any other suitable logic or component. As shown in block 200, the method starts by the 3D graphics driver, for example, which is part of the dynamic surface memory allocation prioritization logic 140, receiving calls from the application. As shown in block 202, the method includes determining whether a resident surface such as one stored in local memory 118 or non-local memory 122 is being referenced by the graphics processing circuitry 116. As shown in block 204, the method includes evicting an allocated surface from its current location to a system memory backing store 124 in response to dynamic surface allocation data. This is illustrated in FIG. 1 by arrow 142. As shown in this example, a surface in local memory, namely surface 142, is evicted to backing store location 124 to make room for a higher priority surface in the local memory. In this example, in addition to using local memory 118 and non-local memory 112, the device 100 also utilizes the system memory backing stores to accommodate tight memory conditions caused by the executing application or other system operations. It will be recognized that eviction of the surface from the current location to the system memory backing store effectively expands the working graphics memory available to the graphics processing circuitry 116. The method also includes, determining, if an evicted surface is being referenced and if so moving the evicted surface into local memory or moving the evicted surface to non-local memory.

The surface 142 or surface 143 may be evicted from a current location, whether the current location is in the non-local memory 122 or the local memory 118, depending upon the priority of a new surface. For example, evicting the surface may occur when at least a new surface needs to be allocated to local or non-local memory and when both the local and non-local memory is exhausted. Eviction may also occur when prioritizing a surface location, such as promoting a surface to a frame buffer and evicting a surface from the frame buffer to make room for the promoted surface. The method includes dynamically allocating the system memory backing store in response to determining that an eviction is necessary and then page locking the backing store. The dynamic allocation may occur, for example, during runtime by taking metrics of various surfaces as described further below.

Figure 3:
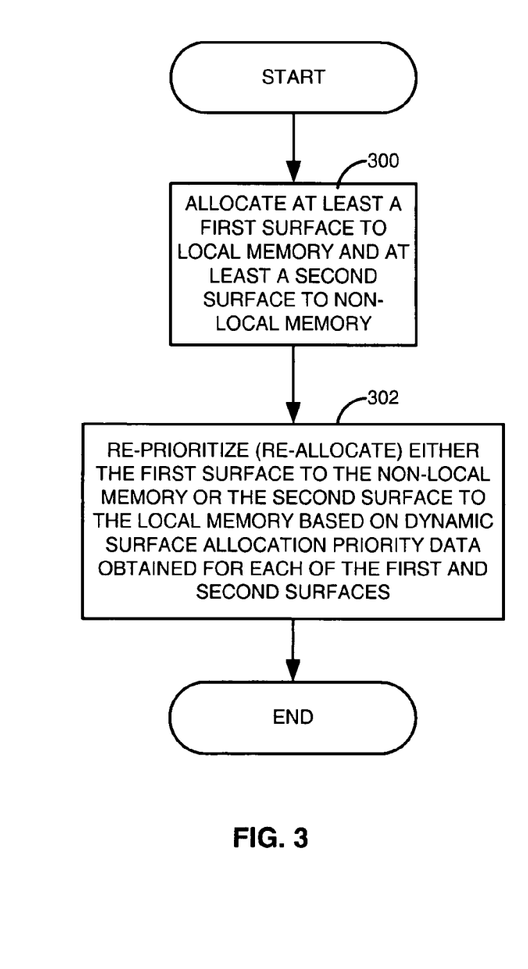
FIG. 3 is a flow chart illustrating one example of a method for allocating memory in accordance with one embodiment of the invention.

FIG. 3 is a flowchart illustrating one example of a method for allocating memory that may be carried out for example by the dynamic surface memory allocation prioritization logic 140 or any other suitable element or elements. Instead of or in addition to the eviction of a surface, the dynamic surface memory allocation prioritization logic 140 by shown in block 300 allocates a first surface to local memory 118 and a second surface to non-local memory 122.

After initial allocation of the plurality of surfaces, the method includes, as shown in block 302, reprioritizing either the first surface to the non-local memory or the second surface to the local memory based on dynamic surface allocation priority data obtained for each of the first and second surfaces. As noted above, the dynamic surface allocation priority data is based on, for example static information and dynamic information. Static information includes, for example, data representing the surface type of a particular surface. For example, the 3D driver may determine the type of surface associated with a given rendering command and store this information as part of the virtual command (see FIG. 7). Different types of surfaces may include, for example, texture buffers, vertex buffers, Z-buffer, color buffers. As such, the buffer description or surface type indicator may be used to determine where a best location would be for a given surface. Since textures are typically large and perhaps accessed frequently, it may be desirable to have a high preference set for texture-type surfaces to be put in the local memory. Vertex buffers can be large and used just as often as textures, but exist fine in non-local memory. The 3D driver has a prior knowledge base which dictates the most optimal placement for surfaces, based on their type.

Dynamically determined information may be, for example, surface usage data that is determined during runtime and may be accumulated by incrementing or decrementing a counter for a given surface each time the surface is used to generate a frame of information or used over multiple frames.

For example, the 3D driver communicates to the logic 140 the preferred order of locations where it expects the surface to eventually reside. For example, it can specify local FB as choice #1, non-local as choice #2 and cacheable memory as choice #3. Additionally, the surface's Weight Factor (e.g. a numerical value from 0 to 255) will also be made available to logic 140: a value of 0 will signify least important and 255 will mean most important. The logic 140 will strive to place the most important surfaces into their first choice preference locations by either performing demotions (to other graphics memory locations) or evictions (to system memory backing store).

In addition to this static priority information, logic 140 will determine the dynamic priority of each non-optimally placed surface by monitoring the usage of the surface. In order to determine the frequency of use, logic 140 saves the frame number in which each surface was last used (call it LastUsedFrame). There are typically many submits occurring per frame, so the frame information will be constantly updated for those surfaces which are being actively used. However, for the surfaces which are not used often, the last used frame will lag the current frame count. And the difference between the current frame count and the last used frame, weighted by the importance of the surface (i.e. its WeightFactor value) indicates the dynamic priority of the surface. In a formula notation, one can express the priority as:

Dynamic Allocation Surface Priority
Data=WeightFactor/($2^x$(CurrentFrameCount−LastUsedFrame)), where $x$ is the power operator (i.e. as in raising one number to the power of another).

As an example, consider the following configuration illustrated in TABLE I:

TABLE I

| Surface No. | Weight Factor | Current Frame Count | Last Used Frame | Computed Dynamic Priority |
|---|---|---|---|---|
| A | 192 | 606 | 603 | 24 |
| B | 128 | 606 | 604 | 32 |
| C | 192 | 606 | 601 | 6 |

Surface B will have the highest priority and will be deemed most valuable among the 3 surfaces, even though it has the lowest WeightFactor. Note that the WeightFactor and usage are both used in a 'weighted' way to arrive at the most equitable and representative means of assessing the surface's priority. The higher the priority number, the more important the surface is.

Upon every submit call, logic 140 will assess if all of the surfaces referenced in VCOPs are in their optimal locations. If so, it will simply patch their physical addresses into the command buffer and submit it to the graphics processing circuitry 116. If one or more of the surfaces are found to be non-optimally placed (i.e. not resident in the 1st choice preference), it will sort them starting from worst-placed, using these as criteria: (i) location and (ii) dynamic priority. This means that if a surface is located in a 3rd choice location and has a high priority of 250, say, it will be considered more worse-placed than a surface which is in its 2nd choice location with a priority of 250. Logic 140 will then start off with that worst-placed surface and attempt to promote it into the 1st choice location.

At buffer allocate time, memory will not be physically committed, all the pertinent data related to allocation may be saved in the buffer properties structures, to be accessed later at make residency time.

Ideally, it is generally desired to keep all buffers in the local graphics video memory for best performance. However, that memory is scarce, expensive and in many cases, not large enough to accommodate all of the resources that the driver needs to manage. As a result, there will be times when logic 140 will need to undertake the action of evicting buffers or moving them between locations.

There are several scenarios where such intervention may need to take place:

1. At Make Resident time. Logic 140 attempts to place buffers in their first choice preferred locations, however, under memory pressure, some buffers may get placed in the second or other lower preferences. If all possible preferences are exhausted and the allocation still can not be satisfied, logic 140 will need to demote a qualified buffer from preferred location in order to make room for the requested allocation. Demotion policy works as follows: buffer will be moved to a less preferred location, while honoring the location order; if no space can be found in any of the specified preferred locations, the buffer will be then evicted to system memory.

2. Reorganization to achieve first preference locations. In this situation, there may not be any substantial memory pressure, but logic 140 periodically examines the current buffer locations and assess if the ones that didn't get placed in their first choice, can be safely placed there now. This will require low priority buffers to be demoted, in order to make room for the buffers whose locations need to be optimized.

3. Buffer reshuffling to better place a specific resource type. This is somewhat a variation of #2 above, where logic 140 will attempt to relocate a highly used resource (such as textures) from a less favorable location like non-local to a more BW-friendly location like the local FB. Least used buffers in the FB location will need to be evicted to system memory or switch places with the buffers that are being relocated from non-local.

4. Buffer relocation prompted by Locks. In cases of Direct Locks, the client may request that buffers be promoted to higher preference location locations either via (i) moving a buffer from lower to higher preference location, provided that space exists in the preferred destination, or (ii) more aggressively, evict buffers from the higher preference location, with the aim of achieving the first choice preference for the buffer being locked.

Figure 4:
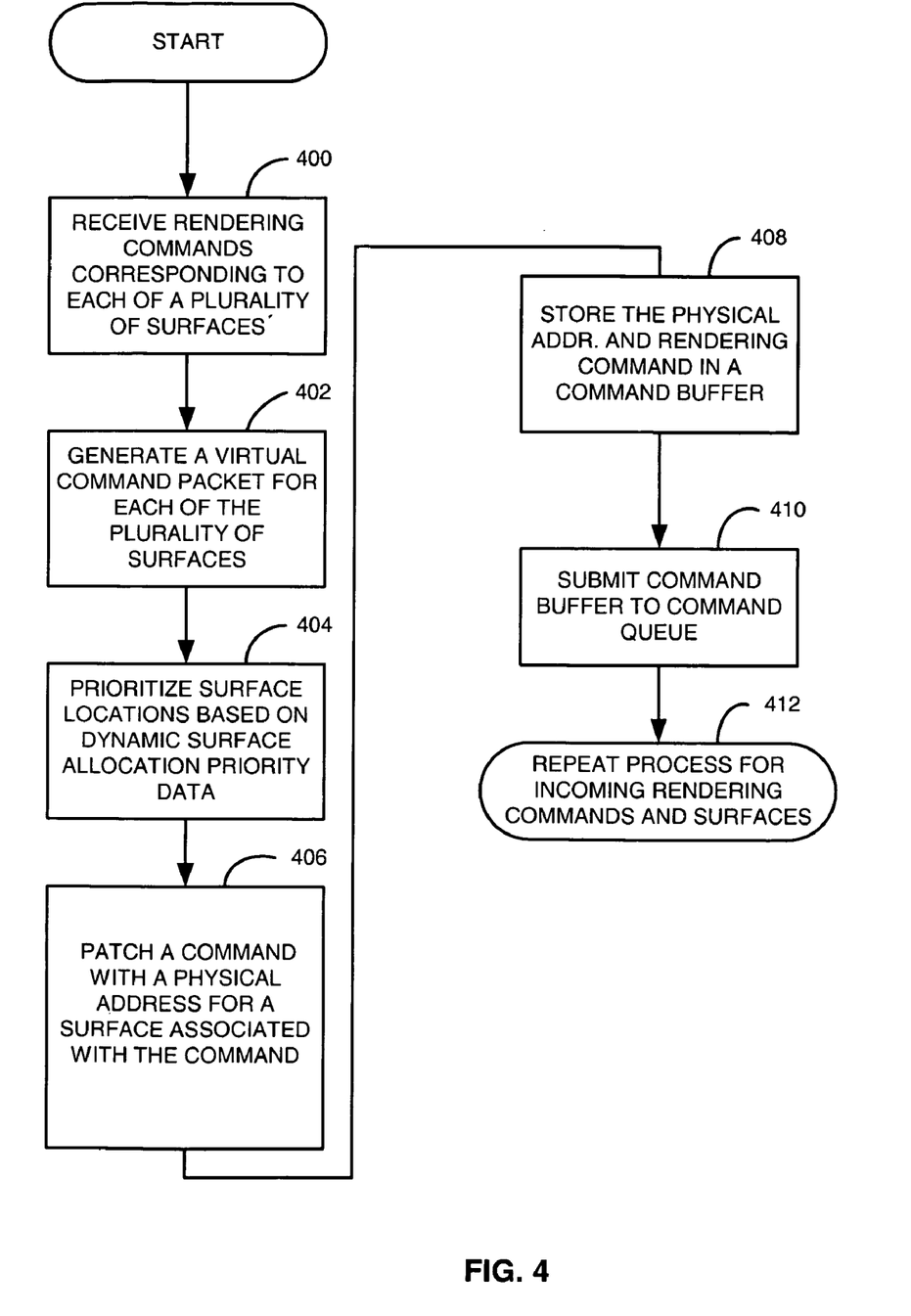
FIG. 4 is a flow chart illustrating one example of a method for allocating memory in accordance with one embodiment of the invention.
Figure 5:
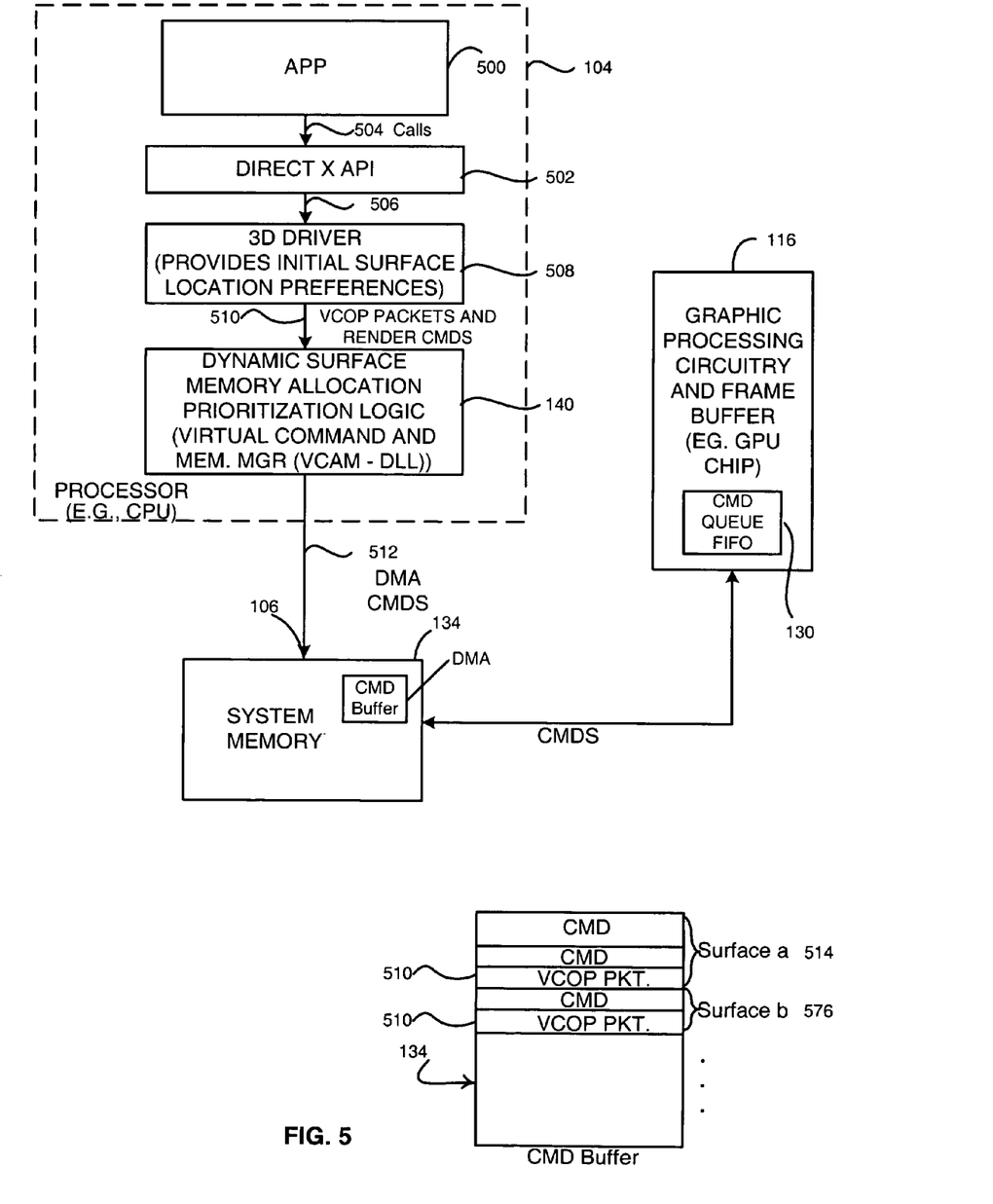
FIG. 5 is a block diagram illustrating one example of an apparatus for allocating memory in accordance with one embodiment of the invention.

Referring to FIGS. 4 and 5, a method of memory allocation will be described in connection with one example shown in FIG. 5 where the dynamic surface memory allocation prioritization logic 140 is implemented, for example, as part of a 3D driver and dynamic link library. As shown in FIG. 4, the method includes receiving rendering commands corresponding to each of a plurality of surfaces as shown in block 400. The method may be carried out by way of example by the processor 104, which in this example is shown executing an application 500 (see FIG. 5) which utilizes a DirectX API 502 and submits calls 504 thereto as known in the art. The 3D driver program 508 receives calls 506 from the direct X API 502. The 3D driver 508 produces rendering commands from the received commands as known in the art corresponding to a plurality of surfaces. The 3D driver 508 then generates a virtual command packet 510 which is generated for each of the plurality of surfaces as shown in block 402. The 3D driver 508 submits rendering commands in addition to the virtual command packets to the logic 140 (e.g., the dll). The virtual command packets 510 are also referred to herein as virtual command op codes (VCOP). The dynamic surface memory allocation prioritization logic 140 which in this example is implemented as a DLL and may also be considered to include part of the 3D driver generates the virtual command packets if desired as any software module may perform any of the described operations. However, for purposes of illustration, the dynamic surface memory allocation prioritization logic in this example is shown to receive the virtual command packets 510. The dynamic surface memory allocation prioritization logic eventually provides direct memory access commands 512 for storage in a command buffer 134 in system memory 106. Generating the virtual command packet 510 is used to virtualize surfaces present in local memory and in non-local memory. Such a virtual command 510 describes a virtualized surface (VCOP) which virtualizes/describes the virtualized surface. There may be many virtualized commands in each rendering command buffer where one virtual command is associated with one surface. As shown in block 406, for the surfaces that have an optimal placement in memory, they are to be submitted to the command queue. The method includes patching a physical address for a surface associated with a given virtual command packet that is associated with a rendering command. As shown in block 408, the method includes storing the physical address and rendering command in a command buffer and, as shown in block 410, submitting the command buffer to the command queue. As shown in block 412, the method may also include repeating the process for incoming rendering commands and surfaces.

Referring to FIG. 5, a diagrammatic illustration of a virtual command buffer prior to patching is shown such that a surface A 514 may include multiple rendering commands but one virtual command packet 510. Likewise, another surface 516 is shown with another command and corresponding virtual command packet 510. Since the command queue 130 needs physical addresses, the virtual handle employed by the virtual command packet 510 as described below is replaced with a physical address so that a surface first has a virtual handle and later has a corresponding physical address so that the command queue 130 can suitably read, write and perform other operations to the surface after it is submitted.

Figure 7:
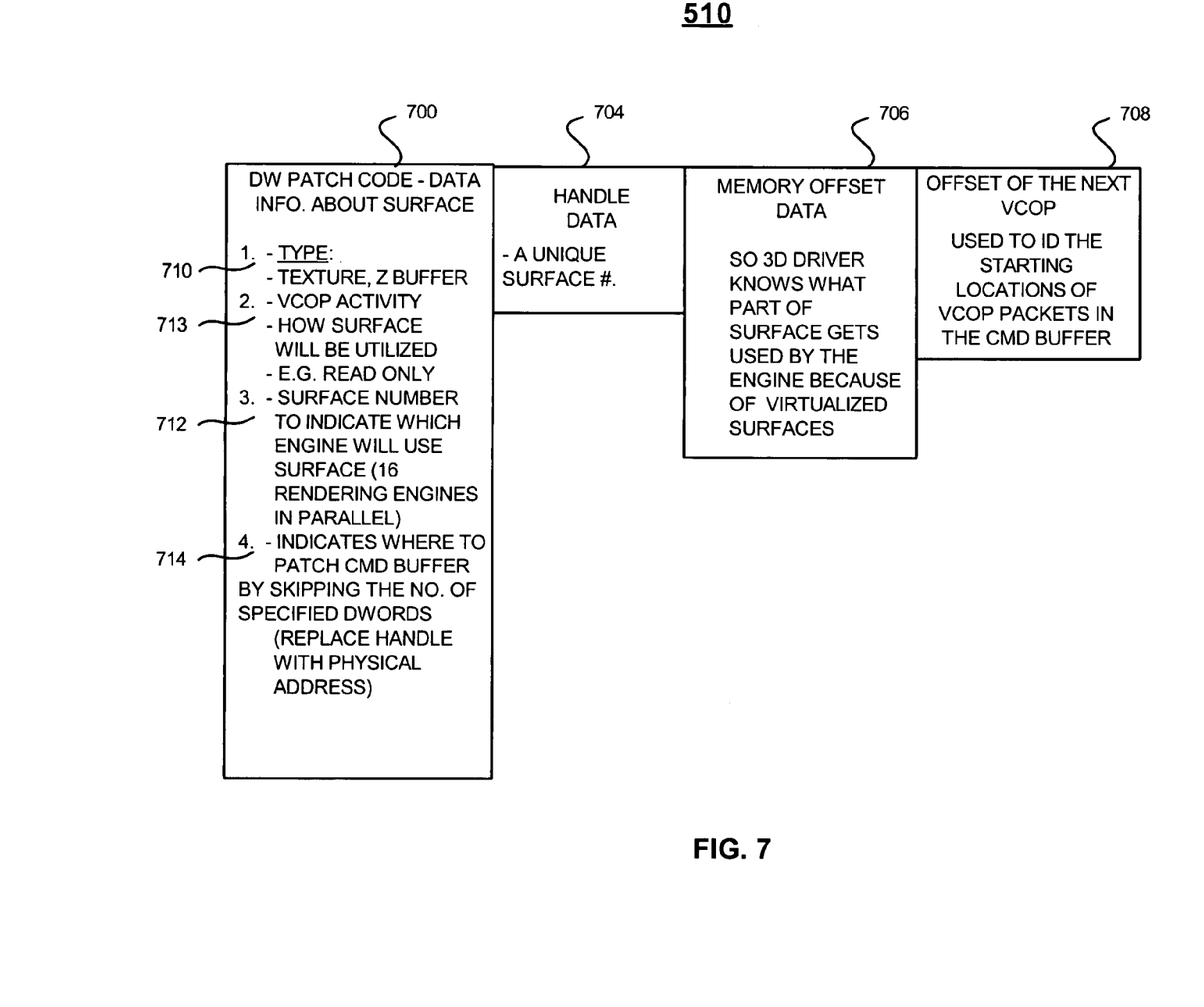
FIG. 7 is a diagram illustrating one example of a virtual command packet in accordance with one embodiment of the invention.

Referring to FIG. 7, one example of a virtual command packet 510 is shown and includes data representing surface description information on a per surface basis 700, intended graphics processing circuitry usage information 702 (e.g., read only, write only read/write), handle data 704 which could be, for example, a unique number, memory offset data 706 and data representing where the next virtual command packet will be in a command buffer shown as data 708. The virtual command packet 510 may also have data, for example, indicating the type of surface 710, a surface number 712 to indicate which engine will use the surface since there may be multiple rendering engines in serial or parallel. There may also be data 714 indicating where to patch the command buffer so that the handle may be replaced with a physical address. The memory offset data 706 is provided so that the logic 140 can use it during submission by knowing what part of the surface gets used by the engine because virtual surfaces may be further virtualized. As such, the 3D driver generates the virtual command packet 510 based on information it maintains or obtains from the application, operating system or other source.

Figure 6:
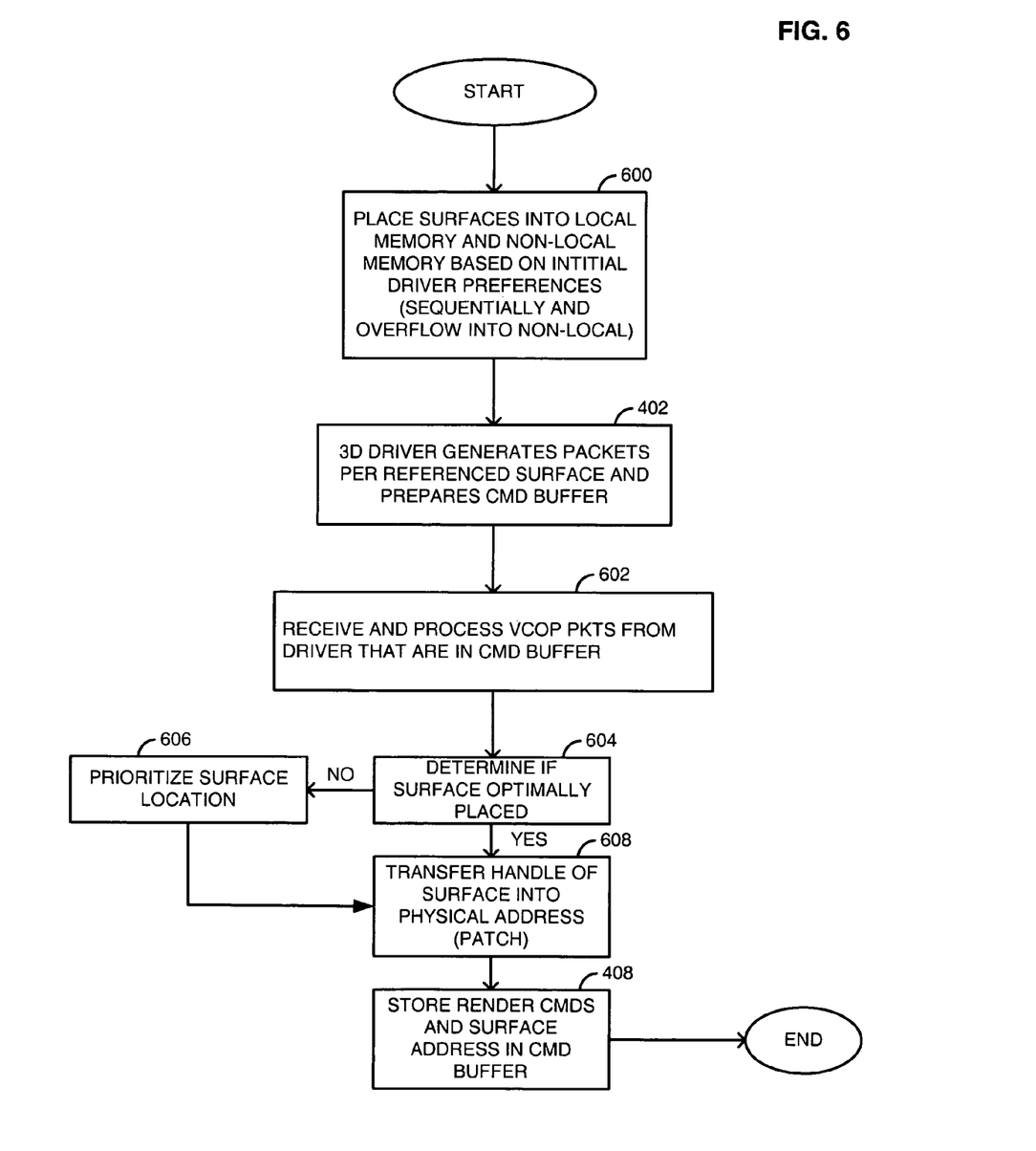
FIG. 6 is a flow chart illustrating one example of a method for allocating memory in accordance with one embodiment of the invention.

Referring to FIG. 6, a method for memory allocation is shown. The method shown in FIG. 6 is one example of surface prioritization which may be carried out, for example, when the 3D driver 508 calls for rendering command submission and as such the surfaces are not committed until they call for a submission. As shown in block 600, the method includes placing surfaces into local memory and non-local memory based on initial driver preferences. As noted above, the driver may indicate that a given surface is of a certain type, and therefore, has a preference that the surface has priority over other surfaces to be stored in local memory versus non-local memory, for example. However, it will be recognized that as surfaces are initially allocated, it is preferable that all the surfaces be placed in local memory until they can no longer fit after which time allocating the surfaces in non-local memory may be suitable. Since some surfaces may overflow into non-local memory, the apparatus and methods described herein reallocate or reprioritize surface locations based on static and dynamic information relating to the surfaces. Block 600 is similar to block 300 of FIG. 3.

As shown in block 402, the method includes generating the virtual command packets per referenced surface and preparing the virtual command buffer (see FIG. 5). The virtual command buffer as described earlier may be stored, for example, in system memory. As shown in block 602, the dynamic surface memory allocation prioritization logic 140 receives and processes the virtual command packets from the driver that are in the virtual command buffer. The dynamic surface memory allocation logic examines the contents of the virtual command packet to obtain information regarding the current surface. As shown in block 604, the method includes determining if the surface is optimally placed. This determination is based on the generated dynamic surface allocation priority data. For example, dynamic allocation surface priority data may be generated and compared among surfaces to determine whether one surface has a higher priority than another and, if so, the higher priority or more preferred surface is placed in the preferred location, namely the local memory. As such, if the surface is not optimally placed, the method includes prioritizing the surface locations shown in block 606 by comparing, for example, the dynamic allocation priority data of one surface to another. However, if the surfaces are already optimally placed, then the method, as shown in block 608, includes transferring the handle of the surface into a physical address, namely patching the command with a physical address for a surface associated with a command as described with respect to block 406 of FIG. 4 to change the virtual command buffer to a non virtual command buffer. As shown, the method includes storing of the render commands and physical surface address in the command buffer shown in block 408.

As part of the prioritization step, it may include reallocating a surface by, for example, promoting a surface from non-local memory to local memory. For example, it may be desirable to swap a surface from the local memory or evicting a surface from local memory to a backing store such as may be the case where a surface is not used often enough so that another surface that is in a non-local store that is used more often may take the place of a lower priority surface. As such, the reallocating of the surface may include allocating or promoting a surface from a non-local memory to local memory based on the dynamic surface allocation priority data or demoting a surface from the local memory to non-local memory or a system memory backing store based on dynamic surface allocation priority data.

In addition to obtaining further performance enhancements, it may be desirable during tight memory constraint conditions, to split the command buffer into rendering command segments based on where a draw operation starts. For example, a header of each draw operation may be evaluated by the logic 140 and by walking through each of the rendering commands and submitting the segments for a command queue that are part of the same draw operation. The method may include waiting for those commands to be executed and then evicting the surfaces before the executed command segment in favor of the next segment in the command queue corresponding with another surface. As such, eviction or reprioritizing of surfaces may be done on a per draw operation if desired.

As described above, in one example, the logic 140 provides virtualized management of the graphics memory (local and non-local), including the frame buffer, AGP if present, and the system memory that is re-mapped by an on-chip GART. The logic 140 also manages the virtualized rendering commands by realizing the commands using physical graphics resources and submitting to the graphics hardware.

Command buffers are virtualized. The virtual rendering commands (VCOP) that deal with surfaces do not have any reference to physical address pointers. Instead, all surfaces (e.g., buffers) are referenced using virtual buffer handles. At the time the buffers are ready to be submitted to hardware, all required buffers are secured in physical memory, and only by then the buffer locations become fixed. The buffer handles in the command buffer are patched with the physical address pointers and the command buffer is then ready for the graphics hardware to process.

In the case where there is insufficient physical graphics memory to make hardware submission possible, buffers resident in local or non-local memory are, if desired, evicted, and relocated to make room for the rendering commands. Rendering commands reference buffers/surfaces, which are to be used in a draw operation. Furthermore, the submission may need to wait for the graphics hardware to process more buffers in order to make room, until all prior buffers become retired. When there is still not sufficient room to accommodate the required buffers, the command buffer may be split in such a way that each partial commands require fewer buffers resident in memory.

As noted above, the decision for physical memory space allocation can be based on client (3D driver) supplied hints; on hardware and software statistics and a set of optimization rules. The logic 140 is responsible for managing all virtualized graphics resources as well as the virtual rendering commands (VCOPs). The logic 140 commits physical memory, and submits physicalized rendering commands to the hardware command queue, i.e. the ring buffer. The logic 140 may be responsible for surface lock and unlock (LOCK) to control surface lock and unlock related sequences for buffer management (BM) to be responsible for tracking of buffer status (surface status), virtual command processing, responsible for interpreting virtual commands. It is also responsible for executing rules and heuristics, as well as processing external hints and manages allocation, eviction and relocation.

In the event that the client has elected not to explicitly specify the weight factor (WF), a value of 0 will be passed in for WF. Logic 140 will handle this case by resorting to internally kept WF values for all the known resource types. Table II illustrates a possible way of assigning such weights:

TABLE II

| Resource Type | Weight Factor |
| --- | --- |
| Color Buffer | 255 |
| Depth Buffer | 255 |
| Texture | 192 |
| Vertex Buffer | 176 |
| Index Buffer | 176 |
| All Others | 128 |

Additionally, the logic 140 monitors the frame count, since it is notified when an end of a scene occurs. For example, historical information from the last N frames may be used to provide a more filtered sense of buffer utilization. As another technique, referring to FIG. 8, where N=8 and 6 buffers are shown with various degrees of activity. Other techniques as mentioned above may also be used.

Figure 8:
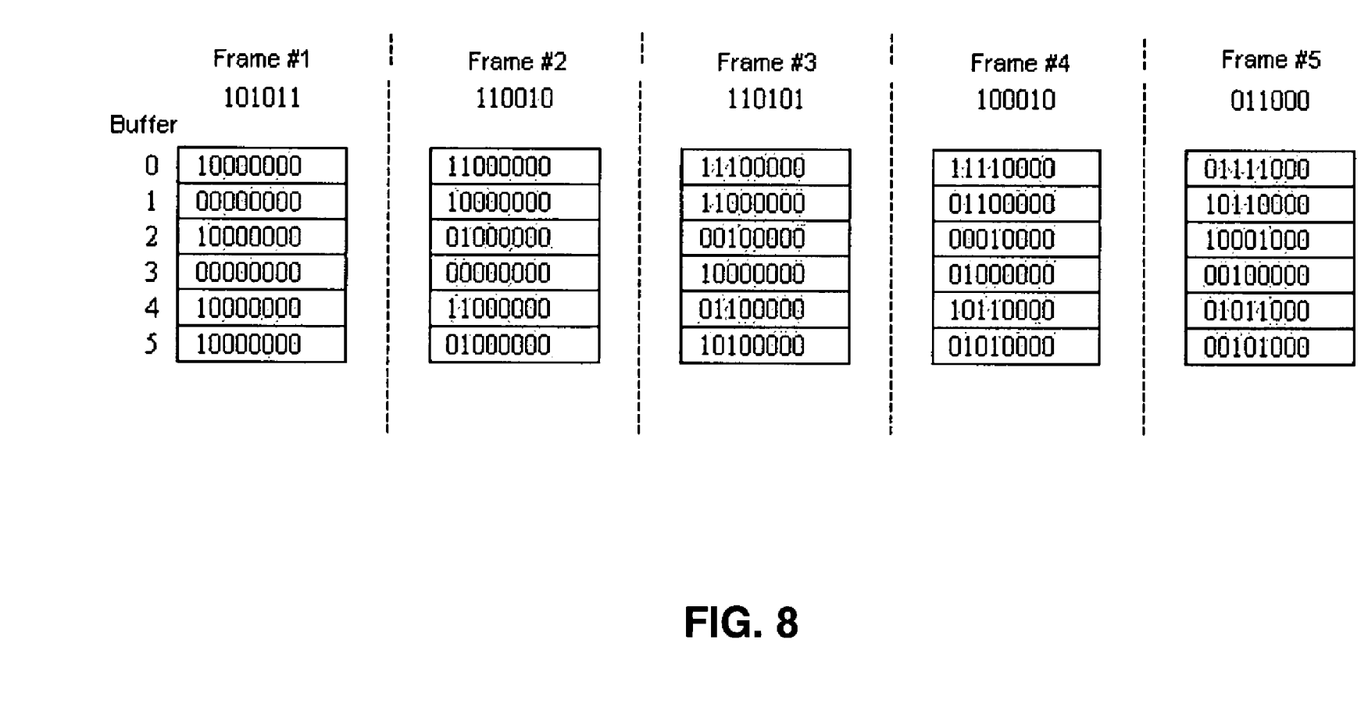
FIG. 8 is a diagram illustrating one example of information that may be used to prioritize surface memory allocation in accordance with one embodiment of the invention.

The 6-bit value under the Frame number indicates which buffer has been referenced in that particular frame, with buffer 0 being leftmost bit and buffer 5 being rightmost bit. An N-bit counter is kept for each buffer. At the end of each frame, the counter is shifted right by 1 bit and a 'buffer referenced' bit (1 if buffer is referenced during the frame and 0 if not) is added as the MSB in the counter. The usage count is derived by reading off the accumulated 8-bit counter value and the priority can be modeled as:

$$Priority=(WF/255)*CounterValue$$

The LastUsedFrame information is also being saved for each buffer (surface) and it will be used to bring the counter value up-to-date for those buffers that have not been referenced. In other words, there would be no need to touch each buffer to update its counter whenever it is not being referenced; whenever buffer priority needs to be retrieved, the counter can simply be updated as follows:

if (CurrentFrame>LastUsedFrame)
CounterValue>>=(CurrentFrame−LastUsedFrame)
else
use current CounterValue As noted above, surfaces that are not currently referenced by graphics processing circuitry can be evicted to system memory backing store to make room for the next draw command. These could be totally dormant surfaces (i.e. dynamic priority=0) or ones which have not been recently used (i.e. low priority like 5 or 10). The presumption here is that once a surface has not been used in the last several frames, chances are that it will not be used in the next frames that follow.

Evicted surfaces that are currently referenced by graphics processing circuitry are paged into either the local frame buffer or moved to page-locked system memory for the graphics processing circuitry to reference. This means that the surfaces which got evicted some time ago and are now being referenced again, will be uploaded into graphics memory (whether local or non-local location), because they are now needed for the current rendering operation. Surfaces are pre-prioritized based on their type and surfaces are weighed based on their usage counts.

'Pre-prioritized' means that the 3D driver will use its internal knowledge base to assess the importance of a surface (i.e. its WeightFactor) and the optimal location (whether local FB, non-local memory, etc). These two pieces of information serve as a means of determining the static priority for a surface. The dynamic priority will be determined from how often the surface is being referenced in rendering operations. Frequently-referenced surfaces allocated from less-preferred locations are re-allocated to more-preferred locations dynamically The determination to relocate such surfaces happens on every submit call. Additionally, so as not to add any burden on the processor 104 processing by the driver, this determination will be enacted only when the driver is sufficiently ahead of the graphics processing circuitry. The dynamic surface memory allocation logic monitors how many frames ahead it processes the commands from the application and as a rule of thumb, in order not to add excessive workload on the CPU, the prioritization will not kick in unless it is one or more frames ahead of the graphics processing circuitry. The logic exits the prioritization loop, once it is determined that the graphics processing logic is catching up to the logic 140. Surfaces are physically allocated (i.e. committed) only when first referenced, thus minimizing wastage of graphics memory.

It is therefore contemplated that the present invention cover any and all modifications, variations or equivalents that fall within the spirit and scope of the basic underlying principles disclosed above and claimed herein.

What is claimed is:

1. A method for allocating memory comprising:
   determining whether a surface stored in a memory location is being referenced by a graphics processing circuit; and
   evicting the surface from the memory location to a system memory backing store based on dynamic surface allocation priority data,
   wherein the evicting is based on a computation of the dynamic surface allocation priority data that comprises: a weight factor associated with the surface and static surface information indicating a determined static surface type of a plurality of different static surface types, wherein the evicting depends on the determined static surface type.

2. The method of claim 1 wherein evicting the surface occurs when at least a new surface needs to be allocated to local or non-local memory and when both the local and non-local memory is exhausted, or when prioritizing a surface location.

3. The method of claim 1 comprising dynamically allocating the system memory backing store in response to determining that an eviction is necessary; and page locking the backing store.

4. The method of claim 1 wherein the memory is either local memory or non-local memory.

5. The method of claim 1 comprising determining if an evicted surface is being referenced and if so move the evicted surface into local memory or move the evicted surface to non-local memory.

6. The method of claim 1 comprising determining if an evicted surface is being referenced and if so page the evicted surface into either local memory or moved evicted surface to non-local memory.

7. The method of claim 1, wherein the computation of the dynamic surface allocation priority data further includes an evaluation of current frame count and last used frame associated with each surface.

8. The method of claim 1 wherein static surface information comprises data representing different types of buffers.

9. The method of claim 1 wherein the plurality of static surface types indicate whether a particular static surface corresponds to at least one of: a texture buffer, a vertex buffer, a z-buffer, and a color buffer.

10. The method of claim 1 comprising:
    receiving rendering commands corresponding to each of a plurality of surfaces;
    generating a virtual command (VCOP) packet for each of the plurality of surfaces wherein the VCOP packet is used to virtualize surfaces present in local memory and in non-local memory;
    patching a physical address for a surface associated with a given VCOP packet that is associated with a rendering command; and
    storing the physical address and rendering command in a command buffer.

11. The method of claim 10 wherein the VCOP packet comprises data representing at least: surface description information on a per surface basis, intended graphics processing circuitry usage information, handle data, memory offset data and where the next VCOP packet will be in a command buffer.

12. A method for allocating memory comprising:
    allocating at least a first surface to local memory and at least a second surface to non-local memory; and
    re-allocating either the first surface to the non-local memory or the second surface to the local memory based on dynamic surface allocation priority data obtained for each of the first and second surfaces,
    wherein the re-allocating is based on a computation of the dynamic surface allocation priority data that comprises: a weight factor associated with each surface and static surface information indicating the determined static surface type of a plurality of different static surface types, wherein the re-allocating depends on the determined static surface type.

13. The method of claim 12 comprising generating the dynamic surface allocation priority data based on at least the surface type data and the surface usage data.

14. The method of claim 12 wherein the method includes generating a VCOP packet containing data representing at least: surface description information on a per surface basis, intended graphics processing circuitry usage information, handle data, memory offset data and where the next VCOP packet will be in a command buffer.

15. The method of claim 12 wherein reallocating comprises promoting the second surface from the non-local memory to the local memory by at least one of: demoting a surface, swapping the surfaces or if there is no room in non-local memory, evicting a surface to a backing store.

16. The method of claim 12 wherein re-allocating at least one of the surfaces comprises:
    allocating the surface from non-local memory to local memory based on the dynamic surface allocation priority data;
    allocating the surface from local memory to non-local memory or a system memory backing store based on the dynamic surface allocation priority data.

17. The method claim 12 further comprising splitting a command buffer into rendering command segments based on where a draw operation starts; submitting the segments for a command queue, wait for the commands to be executed and evict the surfaces for the executed command segment for a subsequent segment.

18. The method of claim 12, wherein the computation of the dynamic surface allocation priority data further includes an evaluation of current frame count and last used frame associated with each surface.

19. The method of claim 12 wherein static surface information comprises data representing different types of buffers.

20. The method of claim 12 wherein the plurality of static surface types indicate whether a particular static surface corresponds to at least one of: a texture buffer, a vertex buffer, a z-buffer, and a color buffer.

21. An apparatus comprising:
    graphics processing circuitry having local memory;
    system memory operatively coupled to the graphics processing circuitry;
    a processor operatively to coupled to memory containing executable instructions that when executed cause the processor to:
        determine whether a surface stored in local memory is being referenced by the graphics processing circuit; and
        evict the surface from the local memory to a system memory backing store based on dynamic surface allocation priority data,
    wherein the eviction is based on a computation of the dynamic surface allocation priority data that comprises: a weight factor associated with the surface and static surface information indicating a determined static surface type of a plurality of different static surface types, wherein the eviction depends on the determined static surface type.

22. The apparatus of claim 21 wherein the memory contains executable instructions that cause the processor to dynamically allocate the system memory backing store in response to determining that an eviction is necessary; and page locking the system memory backing store.

23. The apparatus of claim 21, wherein the computation of the dynamic surface allocation priority data further includes an evaluation of current frame count and last used frame associated with each surface.

24. The apparatus of claim 21 wherein static surface information comprises data representing different types of buffers.

25. The apparatus of claim 21 wherein the plurality of static surface types indicate whether a particular static surface corresponds to at least one of: a texture buffer, a vertex buffer, a z-buffer, and a color buffer.

26. The apparatus of claim 21 wherein the memory contains executable instructions that cause the processor to:
    receive rendering commands corresponding to each of a plurality of surfaces;
    generate a VCOP packet for each of the plurality of surfaces wherein the VCOP packet is used to virtualize memory space between the local memory and the non-local memory;
    patching a physical address for a surface for at least one rendering command associated with a given VCOP packet; and
    storing the physical address and rendering command in a command buffer.

27. The apparatus of claim 26 wherein the VCOP packet comprises data representing at least surface description information on a per surface basis, handle data, memory offset data and where the next VCOP packet will be in a command buffer.

28. An apparatus for allocating memory comprising:
    logic operative to allocate at least a first surface to local memory and at least a second surface to non-local memory; and
    logic operative to reallocate either the first surface to the non-local memory or the second surface to the local memory based on dynamic surface allocation priority data obtained for each of the first and second surfaces,
    wherein the re-allocation is based on a computation of the dynamic surface allocation priority data that comprises: a weight factor associated with the surface and static surface information indicating a determined static surface type of a plurality of different static surface types, wherein the re-allocation depends on the determined static surface type.

29. The apparatus of claim 28 comprising logic operative to generate the dynamic surface allocation priority data based on at least the surface type data and the surface usage data.

30. The apparatus of claim 28 comprising logic operative to generate a VCOP packet containing data representing at least: surface description information on a per surface basis, intended graphics processing circuitry usage information, handle data, memory offset data and where the next VCOP packet will be in a command buffer.

31. The apparatus of claim 28 comprising logic operative to promote the second surface from the non-local memory to the local memory by at least one of: swapping the surfaces or if there is no room in non-local memory, or evicting a surface to a backing store.

32. The apparatus of claim 26, wherein the computation of the dynamic surface allocation priority data further includes an evaluation of current frame count and last used frame associated with each surface.

33. The apparatus of claim 28 wherein static surface information comprises data representing different types of buffers.

34. The apparatus of claim 28 wherein the plurality of static surface types indicate whether a particular static surface corresponds to at least one of: a texture buffer, a vertex buffer, a z-buffer, and a color buffer.

35. An apparatus comprising:
graphics processing circuitry having local memory;
non-local memory and system memory backing store each operatively coupled to the graphics processing circuitry; and
a processor operatively coupled to memory containing executable instructions that when executed cause the processor to:
  determine whether each of a plurality of surfaces reside in its highest attainable preference location within any of the local memory, non-local memory and/or system memory backing store locations by comparing a computed priority value associated with one surface with a computed priority value associated with another surface, wherein each computed priority value is based on both a weight factor and usage associated with a surface, and
  sort the plurality of surfaces based on dynamic surface allocation priority data if it is determined that any of the plurality of surfaces fail to reside within its highest attainable preference location, wherein the sort of the plurality of surfaces starts with a worst-placed surface until each of the plurality of surfaces is placed in its highest attainable preference location.

36. The apparatus of claim 35, wherein the sort causes a surface to be promoted or demoted from any of the local memory, non-local memory and/or system memory backing store locations.

37. The apparatus of claim 35, wherein the highest attainable preference location is based on an assessment of each of the plurality of surface to reside in any of the local memory, non-local memory and system memory backing store choice locations.

38. The apparatus of claim 35, wherein the highest attainable preference location is based on an assessment of each of the plurality of surface to reside in any of the local memory, non-local memory and system memory backing store choice locations.

39. A method for allocating memory comprising:
determining whether each of a plurality of surfaces reside in its highest attainable preference location within any of the local memory, non-local memory and/or system memory backing store locations by comparing a computed priority value associated with one surface with a computed priority value associated with another surface, wherein each computed priority value is based on both a weight factor and usage associated with a surface; and
sorting the plurality of surfaces based on dynamic surface allocation priority data if it is determined that any of the plurality of surfaces fail to reside within its highest attainable preference location, wherein the sorting of the plurality of surfaces starts with a worst-placed surface until each of the plurality of surfaces is placed in its highest attainable preference location.

40. The method of claim 39, wherein the sorting causes a surface to be promoted or demoted from any of the local memory, non-local memory and/or system memory backing store locations.

41. An apparatus comprising:
graphics processing circuitry having local memory;
non-local memory and system memory backing store each operatively coupled to the graphics processing circuitry; and
a processor operatively coupled to memory containing executable instructions that when executed cause the processor to:
  receive an order of preference locations associated with each of a plurality of surfaces, the order of preference locations being based on choice locations of each of the plurality of surfaces within any one of the local memory, non-local memory and/or system memory backing store locations,
  determine whether each of the plurality of surfaces reside in its highest attainable preference location by comparing a computed priority value associated with one surface with a computed priority value associated with another surface, wherein each computed priority value is based on both a weight factor and usage associated with a surface, and
  sort the plurality of surfaces based on dynamic surface allocation priority data if it is determined that any of the plurality of surfaces fail to reside within its highest attainable preference location, wherein the sort of the plurality of surfaces starts with a worst-placed surface until each of the plurality of surfaces is placed in its highest attainable preference location.

* * * * *